Oct. 11, 1927.
C. R. SHORT
THERMOSTATIC VALVE
Filed March 1, 1926
1,644,751
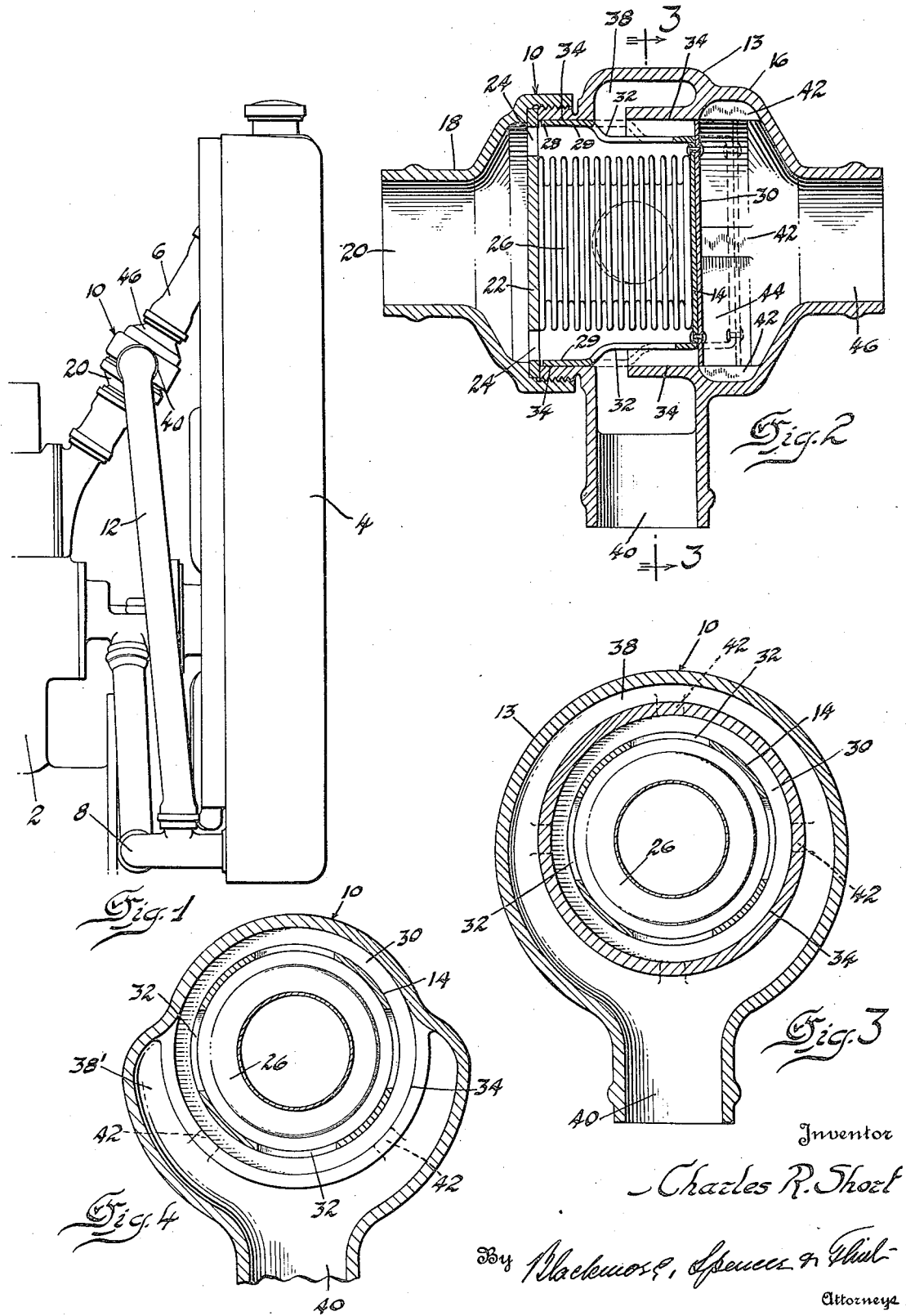

Patented Oct. 11, 1927.

1,644,751

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

THERMOSTATIC VALVE.

Application filed March 1, 1926. Serial No. 91,508.

This invention relates to improvements in valves and particularly thermostatically controlled valves, such as are commonly used in connection with automobile engine cooling systems to bypass the cooling water around the radiator when the engine is cold so that it may more quickly reach a proper working temperature.

I am disclosing in this application an improved form of valve which is characterized by simplicity and ease of manufacture. The valve consists of a housing of special form in combination with a piston controlling ports communicating with the bypass and with the radiator, respectively, so as to divert the flow of water to either one or the other of these paths as desired. The valve is operated by means of a thermostat of conventional design, preferably by direct connection therewith, thus eliminating all levers and other operating connections frequently used. The valve is also so designed that it may be easily fabricated from sheet metal.

In the drawings:

Figure 1 is a side elevation showing my improved valve applied to an automobile engine.

Figure 2 is a sectional view through the valve.

Figure 3 is a section on line 3—3 of Figure 2.

Figure 4 is a view corresponding to Figure 3 but showing a slightly modified form.

In Figure 1 I have shown a portion of an automobile engine at 2, the customary cooling radiator at 4, the upper connection from the motor to the radiator at 6 and the lower connection at 8. These parts may be of any preferred construction. At 10 I have indicated my improved thermostatically controlled valve which is so designed that when the engine is cold it directs a flow of the engine cooling water through the bypass 12 thus cutting the radiator 4 out of the circulating system, and, when the water becomes heated, closes off the bypass connection directing the water through the radiator. While I have illustrated my valve as interposed in the upper radiator connection 6, it may, if desired, be located in the lower connection 8. Both arrangements have been employed heretofore.

The valve 10 is illustrated in detail in Figures 2 and 3 and comprises a casing 13 containing the valve proper in the form of a piston 14. The casing 13 is made in two parts, a body 16 and a cap 18. The cap 18 has threaded engagement with the open end of the body 16 and is formed to provide an inlet port 20. Between the cap and the body is clamped a plate 22 provided with apertures 24. To the central portion of the plate is secured a thermostat 26 shown as of the bellows type, having its free end secured to the interior of piston valve 14. While valve 14 may be made in one piece it is preferably formed of a cup-shaped stamping 28 to the closed end of which the head 30 in the form of a circular disk is secured in any suitable manner. The end of the cup-shaped member 28 adjacent the head is of reduced diameter and is slotted as at 32 for a purpose to be later described. The end of the member 28 remote from the head is of larger diameter as indicated at 29 and is adapted to have a sliding fit with guide surface 34 formed in the body of the casing and apertured to provide an annular channel 38 in communication with port 40 communicating with bypass 12. The head 30 of the piston also has a sliding fit with the guide surface 34 and the latter is extended at this end of the piston in the form of ribs 42 separated by arcuate channels 44 communicating with the radiator outlet port 46.

When the engine is cold piston valve 14 will occupy the position shown in full lines. When in this position the cooling water from the engine entering the valve casing through the port 20 will pass through the openings 24 in the plate 22 into the interior of the piston, then outwardly through the openings 32 in the piston wall into the annular channel 38 and thence through port 40 and bypass 12 back to the engine.

As the engine temperature rises the heat imparted to thermostat 26 by the cooling water will effect an extension of the thermostat to the right as viewed in Figure 2 carrying piston 14 to the position shown in dotted lines in Figure 2. When the piston is in this position the portion 29 of the piston skirt will conceal the entrance to the channel 38. The water passing through the openings 32 in the piston skirt will now pass around the head of the piston through the arcuate channels 44 into the port 46 leading to the radiator.

The construction is very simple. Piston 14, thermostat 26, and plate 22 are assembled upon the bench and then inserted into the open end of the body 16 of the casing. When the cap 18 is secured to the body 16 the valve is securely held in position. There are no moving parts except the thermostat and the piston. The piston is provided with ample guiding surfaces assuring close fit. While the member 20 is illustrated as a casting it is obvious that if desired, it may be constructed of sheet metal parts, although the cast construction is believed to be preferable.

Figure 4 shows a slight modification. This figure is identical with Figure 3 with the exception that the channel indicated at 38', instead of being annular like channel 38 of the preferred form, extends only part way around the valve. This simplifies the casting and at the same time an opening of ample size is provided for the passage of water to the bypass port 40.

While I have illustrated the application of my improved valve to an internal combustion engine cooling system, it is apparent that it is of general utility.

I claim:

1. The combination of a casing having an inlet port and a plurality of outlet ports spaced along the axis of the casing, said casing being provided with a guide surface apertured to provide a passage in communication with one of said outlet ports, and a valve slidably engaging said guide surface and adapted to control the admission of fluid to said passage and to said other outlet port, and a thermostat for controlling said valve.

2. In the combination as defined in claim 1, said valve being in the form of a piston having an apertured skirt and a thermostat housed within said piston.

3. The combination of a casing having an inlet port and a plurality of outlet ports spaced along the axis of the casing, said casing being provided with a guide surface apertured to provide passages communicating with said outlet ports, a piston valve slidably engaging said guiding surface and having its interior in communication with said inlet, said piston having an apertured skirt to permit the flow of fluid from the interior of the piston through one or the other of said outlet ports in accordance with the position of the piston.

4. The combination as defined by claim 3, and a thermostat mounted in said piston for controlling the movement of the latter.

5. The combination of a casing having an inlet port and a plurality of outlet ports, said casing being provided with a cylindrical guide surface apertured to provide axially spaced passages communicating with said outlet ports, a piston valve slidably engaging said guide surface and having its interior in communication with said inlet port, said piston valve comprising a head and a skirt having a portion of normal diameter for sealing and unsealing one of said passages and an apertured portion of reduced diameter adjacent the head for affording communication with said passage when unsealed, said head being in sealing engagement with the other outlet passage when the first named passage is unsealed, and vice versa, and a thermostat for operating said valve.

6. In the combination as defined in claim 5, said thermostat being in the form of a bellows housed within said piston.

7. In a device of the class described, the combination of a cylinder apertured to provide spaced outlet ports, a piston fitted in the cylinder comprising a head and a skirt, a portion of the skirt adjacent the head being apertured and of reduced diameter, and a thermostat for controlling said piston, the portion of the skirt of normal diameter being arranged to seal one of said outlet ports in one position of said piston while the other port remains unsealed, and the piston head being arranged to seal the second-named port when the first-named port is unsealed.

8. A thermostat fitting comprising a base plate, a piston comprising a head and a skirt, a bellows thermostat connecting the base plate and the piston and housed within the latter, said piston having an apertured reduced portion adjacent its head.

In testimony whereof I affix my signature.

CHARLES R. SHORT.